United States Patent
Miyazaki et al.

(10) Patent No.: US 6,329,641 B1
(45) Date of Patent: Dec. 11, 2001

(54) DEVICE AND METHOD FOR CONTROLLING A SOLDERING IRON

(75) Inventors: Mitsuhiko Miyazaki; Takashi Nagase, both of Osaka (JP)

(73) Assignee: Hakko Corporation, Osaka (JP)

( * ) Notice: Subject to any disclaimer, the term of this patent is extended or adjusted under 35 U.S.C. 154(b) by 0 days.

(21) Appl. No.: 09/501,082

(22) Filed: Feb. 9, 2000

(30) Foreign Application Priority Data

Aug. 25, 1999 (JP) .................................................. 11-238160

(51) Int. Cl.[7] ....................................................... H05B 1/02
(52) U.S. Cl. ............................................................. 219/497
(58) Field of Search ..................................... 219/492, 494, 219/497, 499, 501, 505, 507, 509; 323/235, 236, 319

(56) References Cited

U.S. PATENT DOCUMENTS 4,243,875 * 1/1981 Chang .................................. 219/497
5,043,560 * 8/1991 Masreliez ............................. 219/497

* cited by examiner

*Primary Examiner*—Tu Ba Hoang
(74) *Attorney, Agent, or Firm*—Squire, Sanders & Dempsey LLP; David B. Abel

(57) ABSTRACT

A device for controlling the temperature of a soldering iron is provided with a power source circuit 1 which generates pulses having a zero volt period τ; a zero cross detecting portion 2 which generates zero cross pulses on the basis of pulses; a microcomputer unit 3 which receives the zero cross pulses at an interrupt terminal INT and at the same time controls actions of the respective portions; a heater/sensor complex body 4 which heats a soldering iron tip and at the same time detects the temperature; a switching portion 5 which carries out ON and OFF actions on the basis of control signals from the microcomputer unit 3; and an amplifying portion 6 which amplifies a sensor voltage from the heater/sensor complex body 4.

11 Claims, 6 Drawing Sheets

DEVICE AND METHOD FOR CONTROLLING A SOLDERING IRON

BACKGROUND OF THE INVENTION

1. Field of the Invention

The present invention relates to a device and a method for controlling a temperature of a soldering iron tip, and in particular, a device and a method for controlling a temperature, which achieve excellent temperature controlling characteristics with only simplified circuits.

2. Description of the Related Art

For example, a U.S. Pat. No. 5,043,560 has already been known as a method for controlling the temperature of a soldering iron tip, that is, a soldering tip. The invention varies a period of current flow of a soldering iron in a range from 0% to 100% in half the cycle of alternate current voltage, wherein a technology called a pulse width controlling system has been employed. As a rule, it is considered that the invention is excellent in its following ability since the temperature is controlled once every half cycle (H≈8.3 mS).

However, the present inventor examined and confirmed that even though the temperature is controlled once every several milliseconds, there is almost no difference in capacity between in the above case and in a case where the temperature is controlled once every tens of milliseconds, and control adaptive to a thermal response property of a soldering iron tip is sufficient.

Further, where a pulse control system is employed as in the above invention, since waves are generated in such a shape as shown in FIG. 6 in response to the temperature of a soldering iron tip, voltage supplied to a heater is instantaneously switched from an OFF state to an ON state, and high frequency noise is generated. The nearer the current supply term (H–T) is to H/2, the more remarkably the high frequency noise becomes. Provisionally, even though a direct current voltage is supplied to the heater, the high frequency noise cannot be improved as far as a pulse width controlling system is employed.

Still further, the U.S. Pat. No. 5,043,560 has a complicated circuit configuration to achieve the invention, and, moreover, only simple performance can be displayed. Therefore, there remains an unsatisfactory point in the controlling capacity with respect to commencement and pause of operations.

The present invention was developed in view of the above shortcomings and problems, and it is therefore an object of the invention to provide a device and method for controlling a temperature of a soldering iron, which achieves excellent controlling capacity, with only simplified circuit configuration.

SUMMARY OF THE INVENTION

In order to solve the above object, a temperature controlling device according to the invention comprises a heating pulse generating portion which generates heating pulses having a zero voltage period exceeding an appointed width; a reference pulse generating portion for generating reference pulses on the basis of the heating pulses; a controlling portion for commencing a temperature controlling action in synchronization of the reference pulses; a heating portion for heating the soldering iron tip upon receiving the heating pulses and for outputting sensor signals corresponding to the temperature of the soldering iron tip; a switching portion, disposed between the heating pulse generating portion and the heating portion, which performs ON and OFF actions on the basis of control signals from the controlling portion; and an amplifying portion for transmitting the sensor signals to the controlling portion upon qualitatively receiving sensor signals from the heating portion; wherein the controlling portion makes "M" times the cycle of the reference pulses into a temperature controlling cycle T and controls the temperature of a soldering iron tip by providing heating pulses of a variable number N to the heating portion in the temperature controlling cycle T, and the controlling portion picks up sensor signals from the amplifying portion in the zero voltage period, determines a value of the variable number N on the basis of the sensor signals, and determines an ON-action time of the switching portion corresponding to the determined number N.

Since the heating pulse generating portion according to the invention generates heating pulses having a zero voltage period exceeding an appointed width, the controlling portion can pick up sensor signals from the amplifying portion by utilizing the zero bolt period. Therefore, as in prior art devices, it is not necessary to interrupt the heating pulses when picking up the sensor signals, and the amplifying portion can qualitatively receive sensor signals from the heating portion, whereby the circuit configuration and control can be simplified.

Also, since the controlling portion according to the invention makes "M" times the cycle of the reference pulses into a temperature controlling cycle T and controls the temperature of a soldering iron tip by providing heating pulses of a variable number N to the heating portion in the temperature controlling cycle T, it becomes possible to control the temperature in compliance with optimal frequencies responsive to the thermal response performance of a soldering iron tip. Further, since the controlling portion determines the value of the variable number N on the basis of sensor signals, and determines an ON operation time of the switching portion in response to the determined number N, there exists no heating voltage which is instantaneously raised from an OFF state to an ON state, whereby no high frequency pulse is generated.

In addition, the present invention is a temperature controlling device provided with a controlling portion which commences in a temperature controlling action in synchronization with reference pulses. The controlling portion makes a natural number M times the cycle of the reference pulses into a temperature controlling cycle T, the natural number M is selected corresponding to the different thermal properties for different soldering iron tips, and controls the temperature of a soldering iron tip by providing heating pulses of a variable number N corresponding to the temperature of the soldering iron tip in the temperature controlling cycle T. On the other hand, the controlling portion judges, in a case where said variable number N is continuously an appointed value or less, that the soldering iron is in a non-linear status, changes its operation mode from an action mode to a pause mode, and forcibly sets the value of the variable number N to zero.

With the invention, since a pause state of soldering work can be securely detected, and the temperature of the soldering iron is lowered in the pause state, useless power consumption can be decreased, causing the service life of soldering iron tips to be elongated. Further, in the invention, since the temperature of as soldering iron is lowered to around room temperature while in pause. Accordingly, should a user touch a part of the soldering iron tip, there is no fear that the user will receive a burn by mistake.

DETAILED DESCRIPTION OF THE PREFERRED EMBODIMENTS

Figure 1:
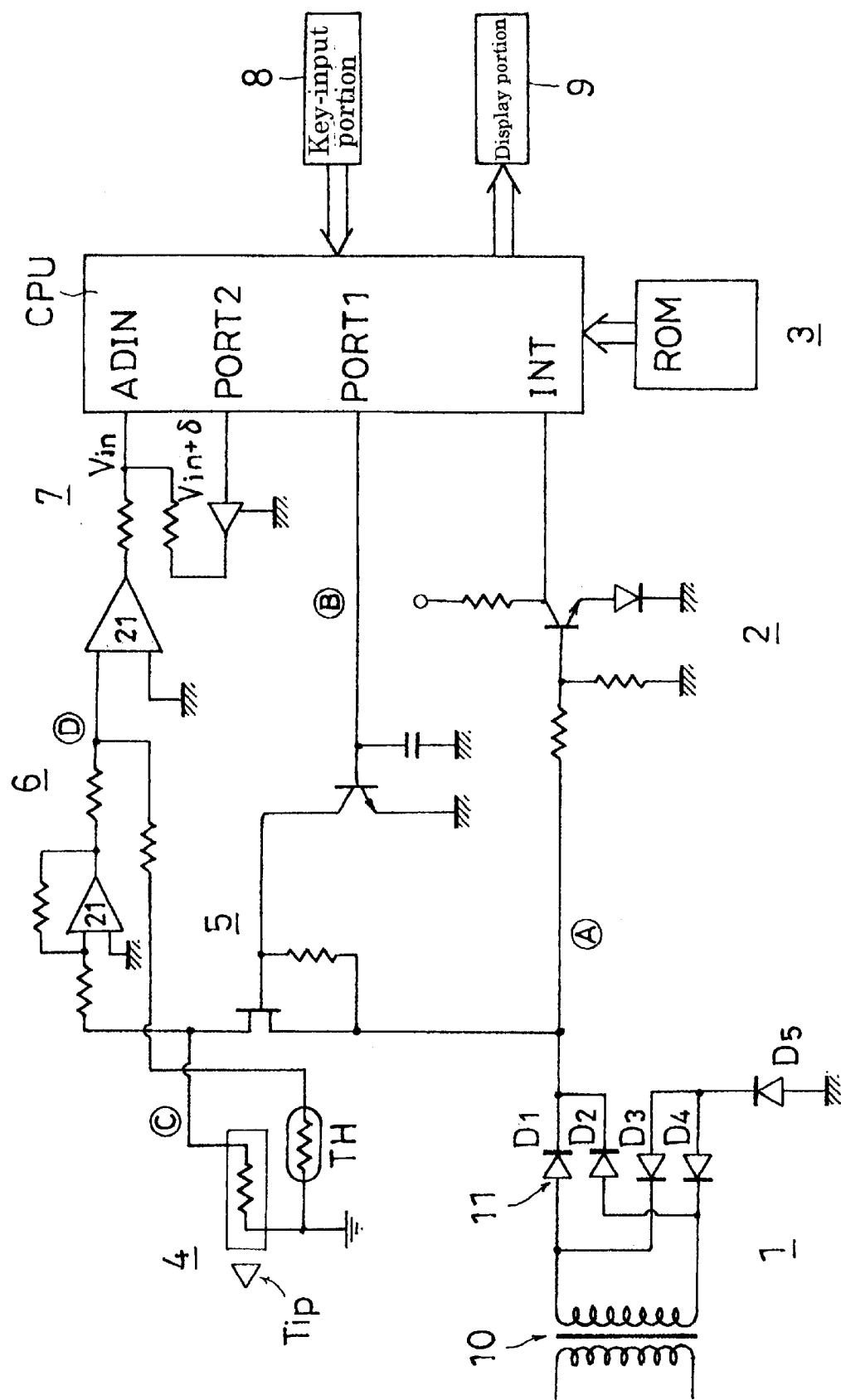
FIG. 1 is a block diagram of a circuit showing one preferred embodiment of the invention.
Figure 2:
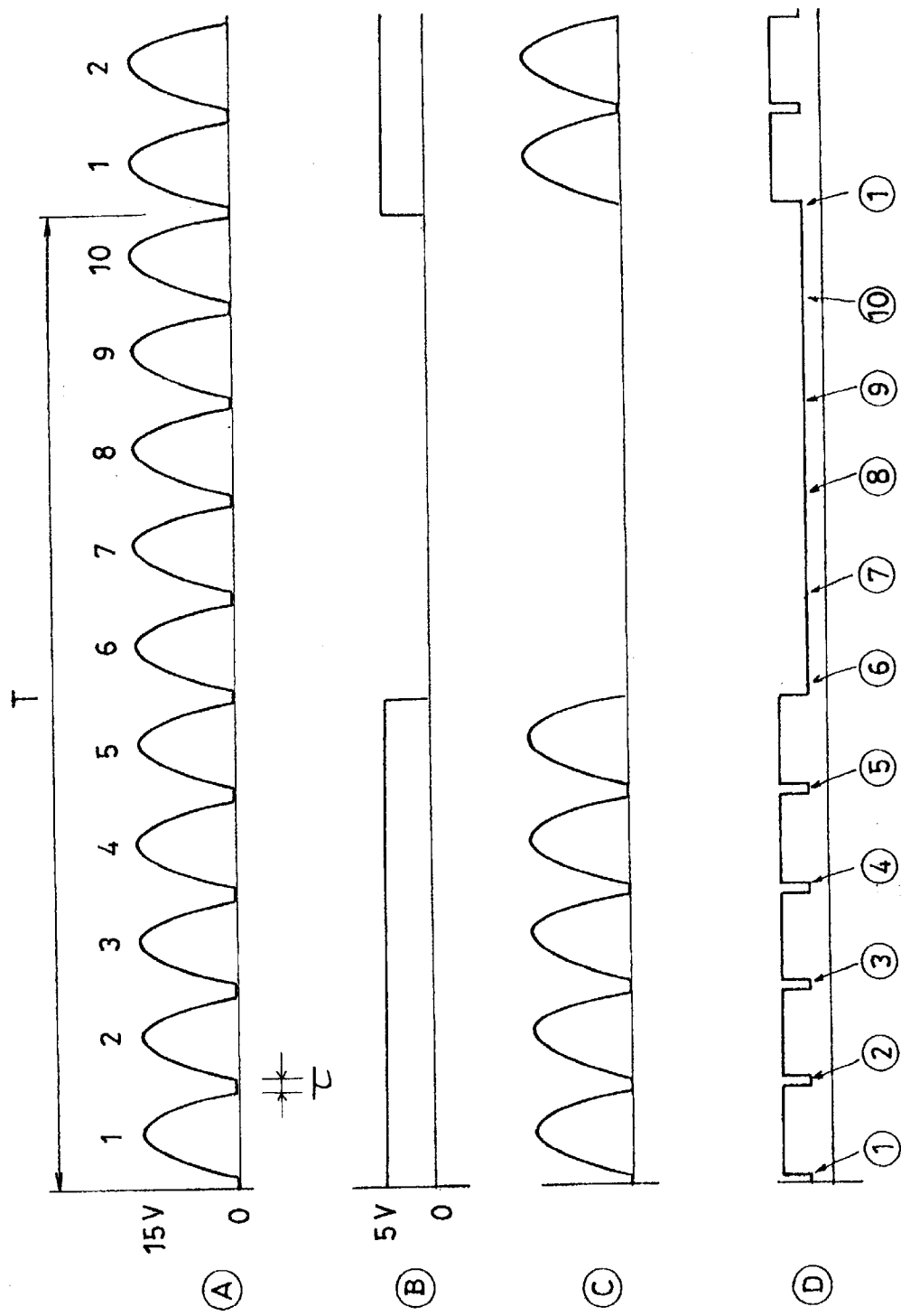
FIG. 2 is a timing chart showing waveforms of respective parts (A, B, C and D) in FIG. 1.

Hereinafter, a detailed description is given of an embodiment of the invention with reference to the accompanying drawings. FIG. 1 is a block diagram showing a general configuration of a temperature controlling device according to the preferred embodiment, and FIG. 2 is a time chart illustrating waveforms at parts in FIG. 1.

As shown in FIG. 1, the temperature controlling device consists of a power source circuit 1 which generates pulsation pulses on the basis of the general commercial alternate current power source, a zero cross detecting portion 2 which generates zero cross pulses on the basis of the pulses, a microcomputer unit 3 which receives zero cross pulses in an interrupt terminal INT and at the same time controls actions of each parts, a heater/sensor complex body 4 which heats a soldering iron tip and simultaneously detects the temperature thereof, a switching portion 5 which performs ON and OFF actions on the basis of control signals from the microcomputer unit 3, an amplifying portion which amplifies a sensor voltage from the heater/sensor complex body 4, a voltage regulating portion 7 which operates to detect the sensor voltage in high resolution, a key-input portion 8 which is operated to set the temperature of the soldering iron tip, and a display portion 9 which displays the temperature of the soldering iron tip.

In detail, the power source circuit 1 is composed of a power source transformer 10 and a full-wave rectifying circuit 11. The power source transformer 10 drops alternate current input power, which is 100V (or 120V) at the primary side, to a secondary voltage of 15V. The full-wave rectifying circuit 11 is a circuit which rectifies the secondary side alternate current voltage (15V) and generates pulses, and it is composed of diodes D1 through D4, which form a so-called bridge circuit, and an additional diode D5 connected to the diodes D1 through D4 in series.

Thus, in the preferred embodiment, since the full-wave rectifying circuit 11 is composed of five diodes, the passage of the rectified current becomes either of D1→load→D5→D4 or D2→load→D5→D3, wherein unless the secondary voltage of the power source transformer 10 is 3×$V_F$ or more, no rectified current flows. Since the voltage drop $V_F$ of the diodes D1 through D5 used in the following direction is approximately 0.9V, a zero voltage period τ of at least approximately 0.6 mS is formed between the respective pulses in the output of the full-wave rectifying circuit 11 (See FIG. 2(a)). Also, the zero voltage period τ can be calculated by an expression SQR(2)×15×SIN (θ)≈0.9×3.

In detail, the zero cross detecting portion 2 is composed of a saturation type amplifier, wherein zero cross pulses are generated by reversing and amplifying the pulses shown in FIG. 2(a). And, the zero cross pulses are provided to the interrupt terminal INT of the microcomputer unit 3. Further, although the microcomputer unit 3 executes an interrupt processing program on the basis of the interrupt pulses, in the preferred embodiment, ten interrupt pulses (=zero cross pulses) constitute a control cycle T. In the control cycle T, acquisition of temperature data and determination of an action time of the switching portion 5 in the next control cycle are carried out. Also, the control cycle T is 5/f where the power source frequency is f. Therefore, the control cycle is 83.3 mS in the case of f=60 Hz, and 100 mS in the case of f=50 Hz.

The microcomputer 3 is composed of a one-chip microcomputer CPU having an A/D converter incorporated, the one-chip microcomputer CPU controls actions of the respective parts of the device on the basis of programs stored in a ROM. The one-chip microcomputer CPU is provided with output ports PORT1 and PORT2, wherein the ON-OFF actions of the switching portion 5 are controlled by output data of the output port PORT1, and the action contents of the voltage regulating circuit 7 are altered by output data of the output port PORT2.

In addition, the one-chip microcomputer CPU is provided with an analog input terminal ADIN connected to the A/D converter incorporated therein, and an output voltage of the voltage regulating circuit 7 is inputted into the analog input terminal ADIN. Also, zero cross pulses from the zero cross detecting portion 2 are added to the interrupt terminal INT of the one-chip microcomputer CPU as described above.

Figure 3:
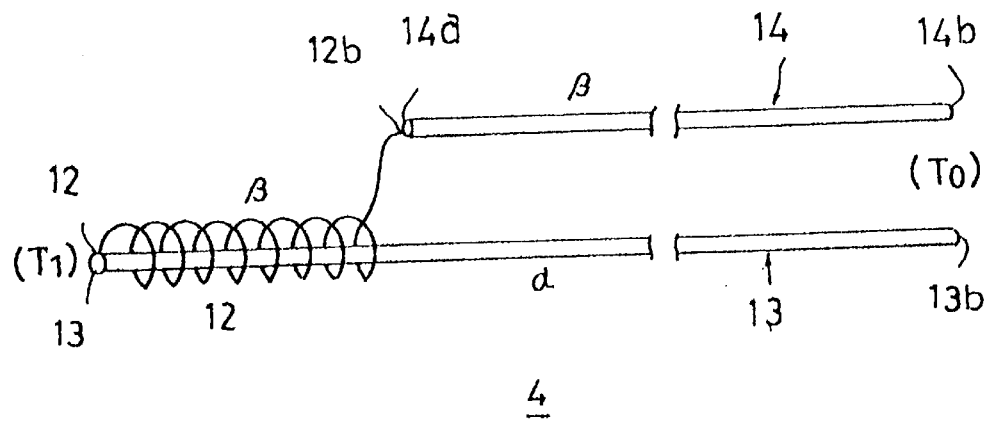
FIG. 3(a) is a general configuration of a heater/sensor complex body, and (b) shows temperature distribution of the heater portion.
Figure 3:
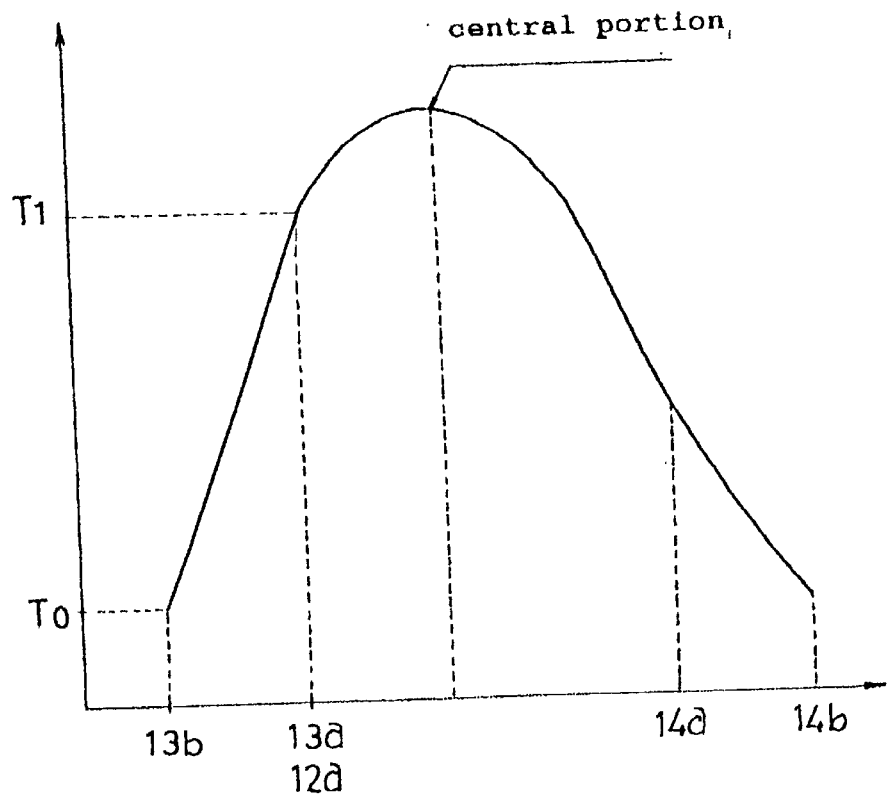

As shown in FIG. 3(a), the heater/sensor complex body 4 is constructed so that the tip end portion 12a of a coil-like wound heating wire member 12 is connected to the tip end portion 13a of a linear non-heating wire member 13 by argon welding. And, the base end portion 12b of the heating wire member 12 is connected to a linear non-heating wire member 14. The material of the heating wire member 12 is made of an iron chromium alloy, the constituents thereof are as shown in Table 1. In the preferred embodiment, Kanthal D (Kanthal wire of the Kanthal Corporation) is used as such an iron chromium alloy. The main constituent ratios thereof are Cr=22.0 and Al=4.8. Also, it is preferable that a constituent ratio like Cr=22.0 and Al=5.8, Cr=22.0 and Al5.3, or Cr=20.0 and Al=4.0 is used.

TABLE 1

|  | Cr | Al | Mn | C | Fe |
| --- | --- | --- | --- | --- | --- |
| Class 1 | 23–27 | 3.5–5.5 | *1.0 | *0.15 | Balance |
| Class 2 | 17–21 | 2–4 | *1.0 | *0.15 | Balance |

In detail, the non-heating wire member 13 is made of a nickel wire while the non-heating wire member 14 and a heating wire member 12 are made of the same Kanthal wire. However, in order to prevent heat generation by the non-heating wire member 14, the wire diameter of the non-heating wire member 14 is set to approximately 2.5 times the wire diameter of the heating wire member 12. As a current is caused to flow into the heater/sensor complex body 4 thus constructed, it is considered that a temperature distribution shown in FIG. 3(b) is obtained by heat generation of the heating wire member 12. That is, the argon welded points 13a and 12a reaches a temperature T1 while the base end portions 13b and 14b of the non-heating wire members 13 and 14 have almost the same temperature T0, and it is comprehended that the middle part of the heating wire member 12 becomes high in temperature.

Since Kanthal wires 12, 14 and a nickel wire 13 constitutes a thermocouple, an electromotive force of approximately $\alpha(T_1-T_0)-\beta(T_1-T_0)$ is generated between the base end portion 13b of the non-heating wire member 13 (nickel wire) and the base end portion 14b of the non-heating wire member 14 (Kanthal wire) where it is assumed that the Seebeck coefficient of the nickel wire is $\alpha$ and the Seebeck coefficient of the Kanthal wire is $\beta$. Herein, since the $\alpha$ and $\beta$ have a different symbol, the electromotive forces of the non-heating wire members 13, 14 are added to each other, wherein the electromotive forces are utilized for measurement of temperature of a soldering iron tip as a sensor voltage. Also, a thermistor TH is disposed at positions where the base end portions 13b and 14b of the non-heating wire members 13 and 14 are disposed (See FIG. 1). The temperature T0 of the base end portions 13b and 14b is measured by the thermistor TH.

As shown in FIG. 1, in details, the switching portion 5 is composed of a field-effect transistor (FET), and the FET performs ON and OFF actions on the basis of the output of the output port OUT of the one-chip microcomputer. The switching portion 5 keeps its ON state in only the period (=N×T/10) equivalent to "N" pulses in the control cycle which is the period equivalent to ten pulses, and provides "N" pulses to the heater/sensor complex body 4 in this period (See FIG.2). Therefore, the longer the ON state of the switching portion 5 is, the more the quantity of pulses provided to the heater/sensor complex body 4 is increased, and the soldering iron tip is heated to a higher temperature.

The amplifying portion 6 consists of a first amplifier 20 which amplifies the sensor voltage from the heater/sensor complex body, a second amplifier 21 which performs amplification by adding the outputs of the first amplifier 20 and the thermistor TH to each other. The input voltage applied to the first amplifier 20 greatly differs, depending on whether the switching portion 5 is in an ON state or an OFF state. That is, if in an ON state, the input voltage is a voltage in which the pulses are caused to overlap on the sensor voltage, and if in an OFF state, the input voltage becomes only the sensor voltage. However, since a zero voltage period $\tau$ of approx. 0.6 mS exists between the respective pulses (See FIG. 2(a)), only the sensor voltage is applied to the first amplifier 20 in the period $\tau$.

The sensor voltage is added to the output voltage of the thermistor TH in the second amplifier 21, and is provided to the analog input terminal ADIN of the one-chip microcomputer CPU after passing through a voltage regulating circuit 7. Subsequently, since the one-chip microcomputer CPU reads signals of the analog input terminal ADIN in an interrupt processing program commenced by zero cross pulses, the period of reading is made coincident with the abovementioned zero voltage period $\tau$, and the one-chip microcomputer CPU can correctly read the added value of the sensor voltage and output voltage of the thermistor (that is, voltage Vin corresponding to $T_0+T_1$).

The voltage regulating circuit 7 is a circuit which adds additional voltage $\delta$ to the output Vin of the second amplifier as necessary, and provides the voltage after the addition to the analog input terminal ADIN of the one-chip microcomputer CPU. That is, the voltage of Vin or Vin+$\delta$ is applied to the analog input terminal ADIN. This process is to make double the resolution of an A/D converter. The principle thereof is described below:

An A/D converter according to the preferred embodiment has only a capacity by which the input analog data can be converted to 0 through 255 digital data. It is assumed that an A/D converter having such resolution power is used and the input analog data are converted to 0 to 511 digital data.

In such a case, for example, either 100.4 level input analog voltage Vin or 100.5 level input analog voltage Vin will be able to be recognized as digital data 100 on the basis of the resolution power of the A/D converter.

Therefore, in the voltage regulating circuit 7, first, 0.5 level analog voltage $\delta$ is added to the input analog voltage Vin. If this is so, in a case where the input analog voltage Vin is 100.4, it is recognized as digital data 100. On the other hand, in a case where the input analog voltage Vin is 100.5, it is recognized as digital data 101. (It is assumed that this is compensation data a).

Next, since the voltage regulating circuit 7 provides the input analog voltage Vin as its level, the A/D converter will recognize either 100.4 level input analog voltage or 100.5 level input analog voltage Vin as digital data 100 (it is assumed that this will become fresh data b). If two types of data a and b thus obtained are added to each other, the 100.4 level input analog voltage is converted to digital data 200(=100+100) while the 100.5 level input analog voltage is converted to digital data 201(=101+100).

By the above-mentioned process, data of $99.5 \leq D1 < 100.5$ are converted to 200, and data of $100.5 \leq D1 < 101.5$ are converted to 201. As a result, using an A/D converter which has only a capacity by which input analog data can be converted to 0 through 255 digital data, it is possible to convert the input analog voltage Vin to 0 through 511 digital data.

Continuously, a description is given of the actions of a temperature controlling device thus constructed. As described above, zero cross pulses whose cycles are 1/(2×f) are applied to the interrupt terminal INT of the one-chip microcomputer, and a temperature controlling action is achieved with ten zero cross pulses constituted as a control cycle T(=5/f). That is, the device controls the temperature of a soldering iron tip in interrupt processing programs commenced by zero cross pulses (interrupt signals), whereby the temperature of the soldering iron tip is made coincident with a set value from the key-input portion.

The processing contents are described in detail. In the first through the fourth interrupt processing programs in the respective control cycles $T_i$, the on-chip microcomputer CPU outputs H-level voltage to the output port PORT2 so as to apply voltage of Vin+$\delta$ to the analog input terminal ADIN (A group of compensation data is assumed to be $a_1, a_2, a_3,$ and $a_4$). And, the one-chip microcomputer CPU calculates SUM←SUM+$a_i$ in the first through the third interrupt processing programs, and calculates SUM←SUM+$a_4$ in the fourth interrupt processing program. Thereafter, the CPU calculates a←SUM/4 and determines the mea of a group of compensation data $a_1, a_2, a_3,$ and $a_4$.

Next, in the fifth through eighth interrupt processing programs, the one-chip microcomputer outputs L-level voltage to the output port PORT2, wherein it is designed that the voltage Vin is applied to the analog input terminal ADIN as it is (these include a group of fresh data $b_1, b_2, b_3,$ and $b_4$). Subsequently, the one-chip microcomputer CPU calculates SUM←SUM+$b_i$ in the fifth through seventh interrupt processing programs and calculates SUM□SUM+$b_4$ in the eighth processing program. After that, the CPU further calculates b←SUM/4 and determines the mean of a group of fresh data $b_1, b_2, b_3,$ and $b_4$.

Subsequently, the one-chip microcomputer CPU calculates a+b±OFFSET in the ninth interrupt processing program and processes to add the input voltage Vin and input voltage Vin+δ. In the addition process, it is possible to convert the input analog voltage Vin to digital data Temp at the resolution power of 512 regardless of using an A/D converter of resolution power of 256. Further, the OFFSET value is determined on the basis of the heat capacity of the soldering iron tip. This is because of a difference in temperature between the temperature of a soldering iron tip and that on the working surface of the soldering iron tip.

Figure 4:
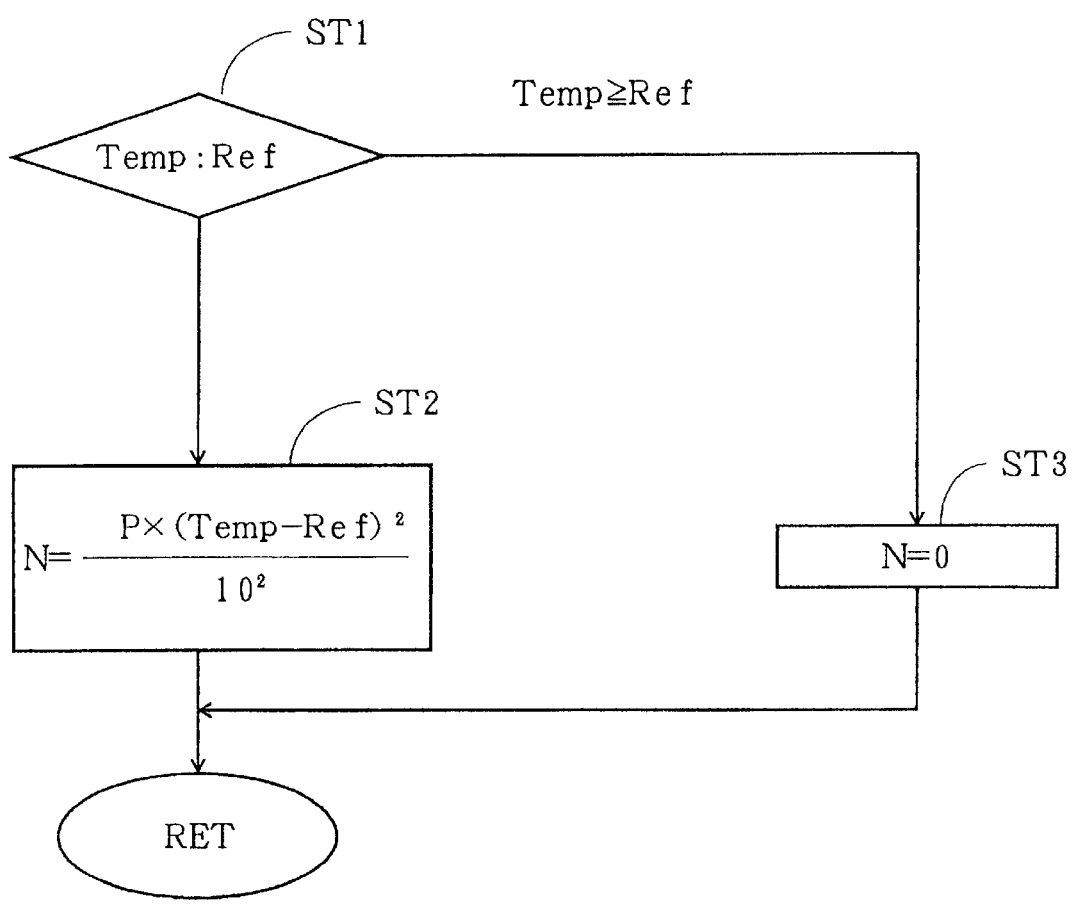
FIG. 4 is a flow chart explaining an algorithm where a number N of pulses to be provided is determined on the basis of a difference in temperature between a measured temperature and a set temperature.

Finally, in the tenth interrupt processing program, the one-chip microcomputer CPU compares the digital data Temp obtained from the A/D converter with a set temperature Ref set from the key-input portion by a user, wherein if Ref≦Temp, a figure N is set to zero (See ST3 in FIG.4). The figure N set in the tenth interrupt processing program is the number of pulses in the next control cycle $T_{i+1}$. Therefore, the one-chip microcomputer CPU continuously outputs L-level signals to the digital output port PORT1 in the next control cycle $T_{i+1}$, wherein since the switching portion 5 is continuously kept OFF, the temperature of the soldering iron tip is lowered since no pulse is provided to the heater/sensor complex body 4.

On the other hand, if Ref>Temp as a result of the comparison, the process shifts to a process of ST2 in FIG.4, wherein a process of $P\times((Temp-Ref)/10)^2$ is carried out, wherein a corresponding integral number N is set on the basis of the result of the calculation. Since the integral number N is the number of pulses to be provided in the next control cycle $T_{i+1}$, the one-chip microcomputer CPU makes the digital output PORT1 thereof by "N" pulses to the H level in the next control cycle $T_{i+1}$.

Figure 5:
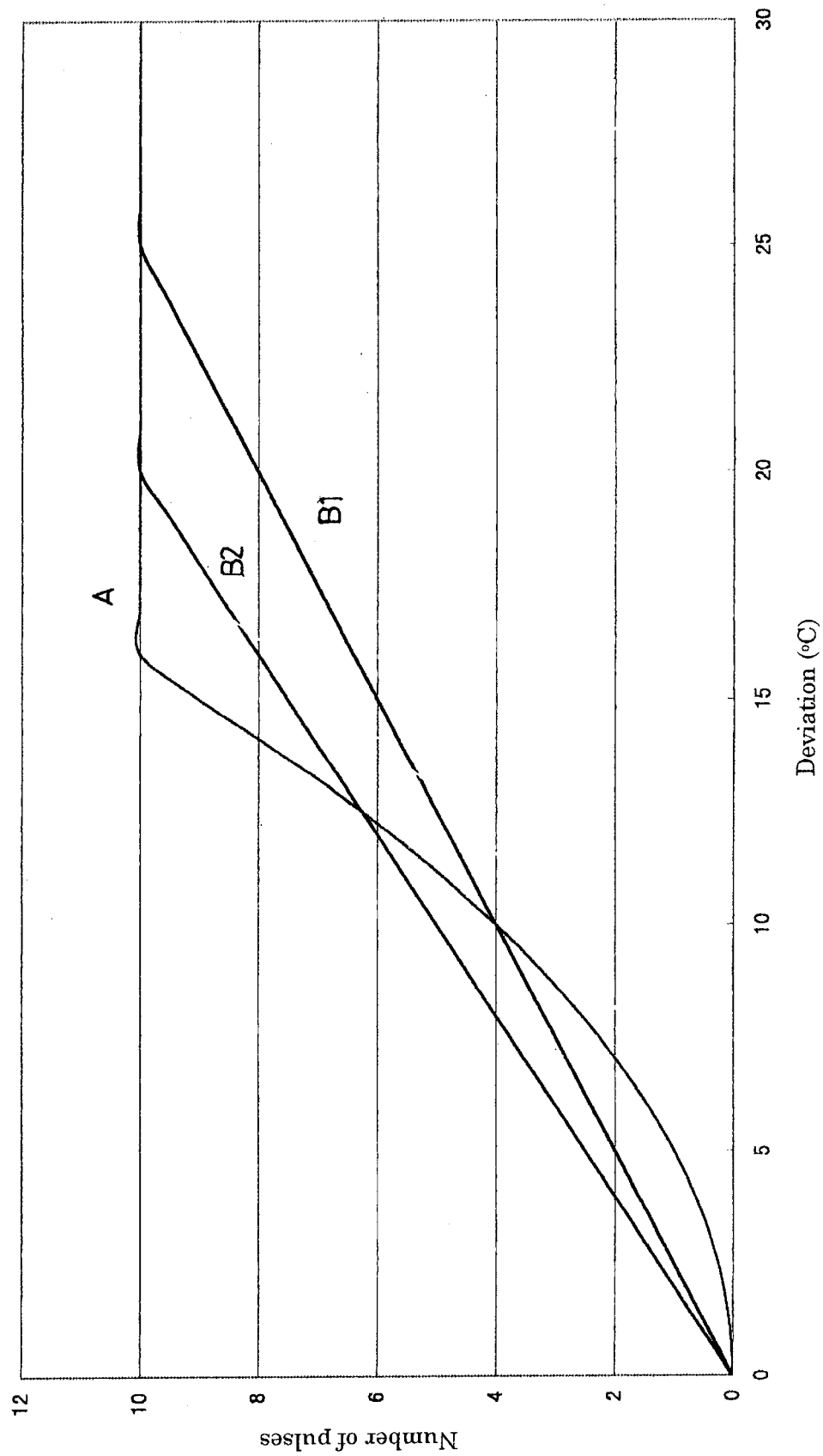
FIG. 5 shows the relationship between a temperature difference and the number N of pulses to be provided, where a soldering iron is controlled by an algorithm shown in FIG. 4.
Figure 6:
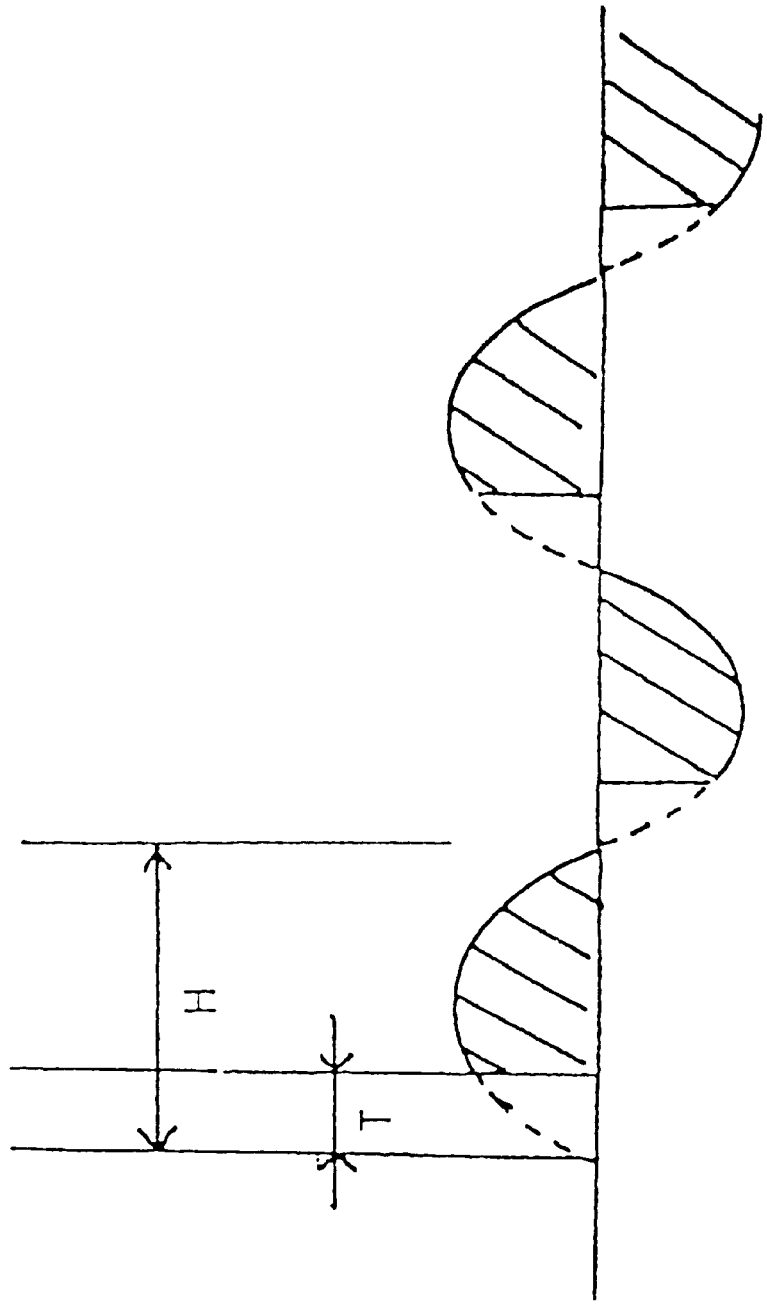
FIG. 6 is a waveform diagram explaining a prior art.

A coefficient P in the process of ST2 in FIG. 4 is determined on the basis of the thermal capacity of a soldering iron tip. However, since, in the device, the number N of pulses to be provided is proportionate to a square of the temperature difference (Temp-Ref) from the set temperature (See a curved line A in FIG. 5), it is possible to further improve the control capacity than in a case of providing pulses proportionate to the temperature difference (Temp-Ref) (See a straight line B in FIG. 5). That is, as has been made clear by comparing the curved line A and the straight line B in FIG. 5, in the preferred embodiment, although the number N of pulses to be provided is a few where the temperature difference is small, the number N becomes remarkably large where the temperature difference is large. Therefore, for example, it is possible to reduce an increase or a decrease in temperature in compliance with a reduced number N after the temperature of a soldering iron tip is raised to an appointed temperature range while the temperature of a soldering iron tip can be raised at once when a soldering work is commenced.

As described above, in the device, the temperature of a soldering iron tip is controlled by controlling how many pulses are provided, in the control cycle T. As in a prior art device, since there is no chance where any remarkable increase in voltage occurs, it is not necessary to worry about generation of high frequency noise. Further, since the number N of pulses to be provided to the heater/sensor complex body is proportionate to the square of the temperature difference (Temp-Ref) from the set temperature, a controlling capacity can be improved.

Further, in the device, power supply to the heater/sensor complex body 4 is automatically shut off in cases where soldering work is discontinued during a longer period of time. Therefore, it is possible to eliminate useless power consumption and to lengthen the service life of soldering iron tips. That is, the one-tip microcomputer CPU judges that the soldering iron is in use if the number N of pulses provided in each of the control cycles exceeds an appointed value (for example, 5), and judges that the soldering iron is not being used (idling) where the number of pulses provided is less than an appointed number N1.

And, as the number of pulses to be provided becomes less than an appointed number N1 (that is, the soldering iron enters an idling state), the period of continuation thereof is automatically measured, wherein if the idling state is continued in an appointed period of time (for example, 30 minutes or more), the mode of the soldering iron enters a pause mode after an alarm is issued.

In the pause mode, the output of the output port PORT1 is set to the L level to interrupt power supply to the heater/sensor complex body 4. On the other hand, a temperature measuring process in an interrupt processing program is still continued, and the one-chip microcomputer CPU monitors the temperature of the soldering iron tip. Also, the one-chip microcomputer CPU always monitors whether or not the key-input portion 8 is operated.

Where a certain key input is given, the pause mode is stopped, and the usual temperature control action is re-commenced. On the other hand, where the temperature of the soldering iron tip is continuously lowered to become an appointed temperature (for example, 100° C.) without any key input, operations of the key input are neglected, and the pause mode is continued regardless of operations of the key input. Further, if the power source is switched on again after the power source switch is turned off, the pause mode can be changed to the usual control action.

As described above, according to the invention, it is possible to achieve excellent control performance with a remarkably simplified circuit configuration.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. A device for controlling a soldering iron, comprising:
   a heating pulse generating portion which generates heating pulses having a zero voltage period exceeding an appointed width;
   a reference pulse generating portion for generating reference pulses on the basis of said heating pulses;
   a controlling portion for commencing a temperature controlling action in synchronization of said reference pulses;
   a heating portion for heating a soldering iron tip upon receiving said heating pulses and for outputting sensor signals corresponding to the temperature of the soldering iron tip;
   a switching portion, disposed between said heating pulse generating portion and said heating portion, which performs ON and OFF actions on the basis of control signals from said controlling portion; and
   an amplifying portion for transmitting said sensor signals to said controlling portion upon qualitatively receiving sensor signals from said heating portion;
   wherein said controlling portion makes a natural number M times the cycle of said reference pulses into a temperature controlling cycle T and controls the temperature of the soldering iron tip by providing heating pulses of a variable number N to said heating portion in the temperature controlling cycle T, and said controlling portion picks up sensor signals from said amplifying in said zero voltage period, determines a value of said variable number N on the basis of said sensor signals, and determines an ON-action time of said switching portion corresponding to the determined number N.

2. A device for controlling a temperature, as set forth in claim 1, wherein said heating pulse generating portion is composed of a full-wave rectifying circuit and an additional diode connected, in series, to the full-wave rectifying circuit.

3. A device for controlling a temperature, as set forth in claim 1, wherein said controlling portion is provided with a CPU (central processing unit) and an A/D (analog/digital) converter, said reference pulses are provided to said CPU as interrupt signals, and a determination process of said variable number N is distributedly carried out in a series of interrupt processes which are commenced by the interrupt signals.

4. A device for controlling a temperature, as set forth in claim 1, wherein said controlling portion is provided with a CPU and an A/D converter, said A/D converter converts sensor signals from said heating portion to measured temperature data, and said variable number N is determined in a non-linear status on the basis of a difference in temperature between the measured temperature data and a set temperature.

5. A device for controlling a temperature, as set forth in claim 4, wherein said controlling portion determines said variable number N on the basis of a square value of a temperature difference between the measured temperature data and the set temperature.

6. A device for controlling a temperature, which is provided with a controlling portion for commencing a temperature controlling action in synchronization of reference pulses, wherein said controlling portion makes a natural number M times the cycle of said reference pulses into a temperature controlling cycle T, and controls the temperature of a soldering iron tip by providing heating pulses of a variable number N corresponding to the temperature of the soldering iron tip in the temperature controlling cycle T, and on the other hand, the controlling portion judges, in a case where said variable number N is continuously an appointed value or less, that the soldering iron is in a non-linear status, changes its operation mode from an action mode to a pause mode, and forcibly sets the value of the variable number N to zero.

7. A device for controlling a temperature, as set forth in 6, wherein said controlling portion monitors a key-input portion, and restores the operation mode from the pause mode to the action mode if a certain key input is provided.

8. A method for controlling a temperature of a soldering iron tip using a controlling portion provided with a CPU, wherein said controlling portion makes a natural number M times a cycle of interrupt pulses given to said CPU into a temperature controlling cycle T, and controls the temperature of a soldering iron tip by providing heating pulses of a variable number N to a heating portion which heats the soldering iron tip, in the temperature controlling cycle T, and said controlling portion determines a variable number N in a non-linear status on the basis of a difference in temperature between the temperature of a soldering iron tip and a set temperature.

9. A method for controlling a temperature of a soldering iron tip using a controlling portion provided with a CPU, wherein said controlling portion makes a natural number M times a cycle of interrupt pulses given to said CPU into a temperature controlling cycle T, and controls the temperature of a soldering iron tip by providing heating pulses of a variable number N to a heating portion which heats the soldering iron tip, in the temperature controlling cycle T, and said controlling portion has an action mode and a pause mode, judges, in a case where said variable number N is continuously an appointed value or less that the soldering iron is in a non-linear status, changes the mode thereof from an action mode to a pause mode, and forcibly sets the value of said variable number N to zero.

10. A method for controlling a temperature, as set forth in claim 9, wherein said controlling portion monitors a key-input portion and restores the mode from the pause mode to the action mode if a certain key input is provided.

11. A temperature controlled soldering iron, comprising:

a heating pulse generator which generates heating pulses having a zero voltage period exceeding an appointed width;

a reference pulse generator for generating reference pulses on the basis of said heating pulses;

a controller for commencing a temperature controlling action in synchronization with said reference pulses;

a heating element for heating a tip of said soldering iron upon receiving said heating pulses and for outputting sensor signals corresponding to the temperature of said tip;

an amplifier for transmitting said sensor signals from a heating portion to said controller;

a switch, disposed between said heating pulse generator and said heating element, which switches between an ON and OFF state on the basis of control signals from said controller wherein said controller determines a temperature controlling cycle T by multiplying a natural number times said reference pulses and controls the temperature of said tip based on said sensor signals from said amplifier which are used to determine a value of a variable number N and determine an ON-action time of said switch corresponding to the determined value of said variable number N to provide heating pulses of a variable number N to said heating portion within each temperature controlling cycle T.

* * * * *